United States Patent
Mallory

[15] 3,656,061

[45] Apr. 11, 1972

[54] PORTABLE BATTERY TESTER WITH MEANS TO SIMULATE NORMAL OPERATING DRAIN CONDITIONS

[72] Inventor: Henry Rogers Mallory, Greenwich, Conn.
[73] Assignee: P. R. Mallory & Co., Inc., Indianapolis, Ind.
[22] Filed: June 11, 1970
[21] Appl. No.: 45,524

[52] U.S. Cl. ..................................................324/29.5
[51] Int. Cl. ..................................................G01n 27/42
[58] Field of Search ......................................324/29.5

[56] References Cited

UNITED STATES PATENTS

| | | | |
|---|---|---|---|
| 2,229,009 | 1/1941 | Berry | 324/29.5 |
| 2,225,051 | 12/1940 | Heyer | 324/29.5 |
| 2,540,225 | 2/1951 | Wengel | 324/29.5 X |
| 2,675,522 | 4/1954 | Godshalk | 324/29.5 |

Primary Examiner—Rudolph V. Rolinec
Assistant Examiner—R. J. Corcoran
Attorney—Robert Levine

[57] ABSTRACT

A portable battery tester with a meter to measure the battery voltage through a series resistor adjusted to limit the current to the meter to the operating range of the meter, and with variable shunt resistors adjustable to a value that will simulate the load conditions to which the battery is to be applied, to simulate the current drain for that usage.

4 Claims, 6 Drawing Figures

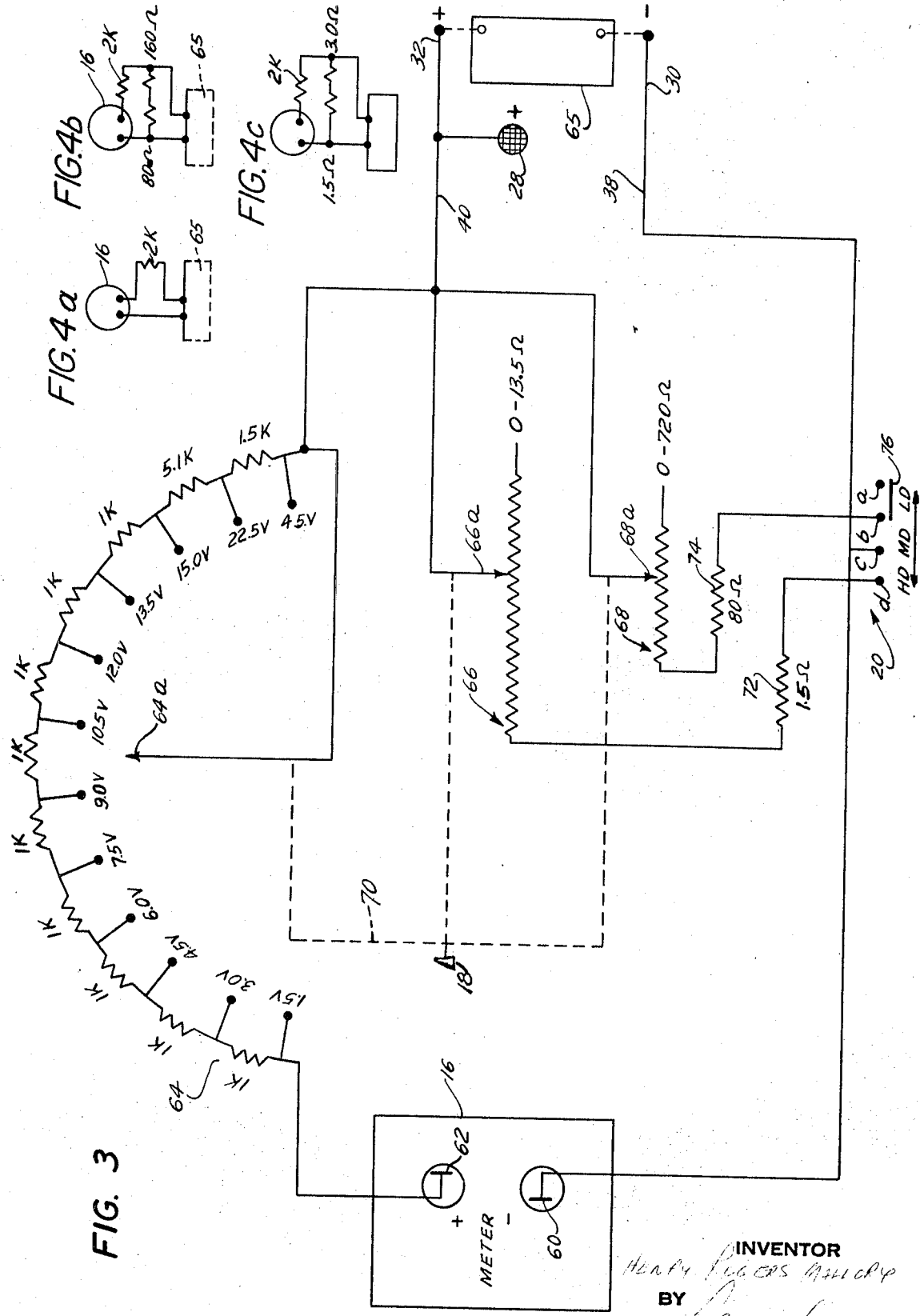

PORTABLE BATTERY TESTER WITH MEANS TO SIMULATE NORMAL OPERATING DRAIN CONDITIONS

DESCRIPTION OF THE INVENTION

This invention relates to a portable battery tester for testing batteries of various voltages, under current drain conditions which simulate and correspond to the operating conditions of the intended application and use of the battery. The conventional battery testers generally test batteries solely according to the voltage of the battery, but do not operate the battery tester to provide for a test that will consider also the service conditions which the battery will encounter and be exposed to.

The object of this invention is to provide a battery tester that will test batteries of various voltages, under current drain conditions that simulate the load conditions under which the battery will be used in equipment in the field.

The novel feature in this new all purpose battery tester provides two load simulating shunt rheostats, in addition to, a conventional series variable resistor, all of which are coupled to a rotary battery voltage range changing switch. The series resistor and the two shunt rheostats are connected to a three position auxiliary slide switch which selects and establishes the approximate current drain to simulate the use conditions for which the battery under test is intended. The three position slide switch provides for testing for three kinds of current drain, namely, light drain, medium drain and heavy drain. Light drain is used for camera electric eye, clock, or hearing aids. Medium drain is used for radio, tape recorder or electronic equipment. Heavy drain is used for flashlight, lantern, photoflash, motor drive, or television. The approximate current loading in the tester for batteries containing one through ten cells shown for purposes of demonstration, is 1 ¼ milliamperes for light drain; 15 milliamperes for medium drain; and 1 ampere for heavy drain. The 15 and 30 cell battery position of the tester conventionally tests batteries only under the 1 ½ milliampere light drain load and in those positions the shunt rheostats are open.

In operation the voltage rotary switch is set to vary the number of series resistors to match the voltage rating of the battery under test. The drain slide switch is then set to light drain, medium drain or heavy drain, which adjusts the shunt resistors to values corresponding to the conditions in the intended application for which the battery will be used. The battery is then tested in the conventional manner by connecting the positive terminal of the battery to the positive lead of the tester, and the negative battery terminal to the negative lead of the tester. A serrated metal button at positive potential is included on the face of the tester to facilitate testing of small batteries with terminals at opposite ends such as AAA, AA, C and D cells, etc. Two flexible leads are provided for testing batteries with both terminals at one end.

The general construction of the battery, and the arrangements of the several components thereof, as well as the internal circuit diagram for the arrangement of the resistances between the indicating meter and the input terminals to the battery tester, are all described in more detail in the following specification, taken together with the accompanying drawings, in which FIG. 1 is a front elevational view of the tester showing the meter, an operating knob for the voltage setting switch, and showing an auxiliary slide switch for the rheostate for drain conditions;

FIG. 3 is a schematic circuit diagram of the battery tester showing the indicating meter and the arrangement of the adjustable resistances disposed between the meter and the input terminals to the tester; and FIGS. 4a, 4b, and 4c are a set of three circuit diagrams for one voltage setting of the tester.

Figure 2:
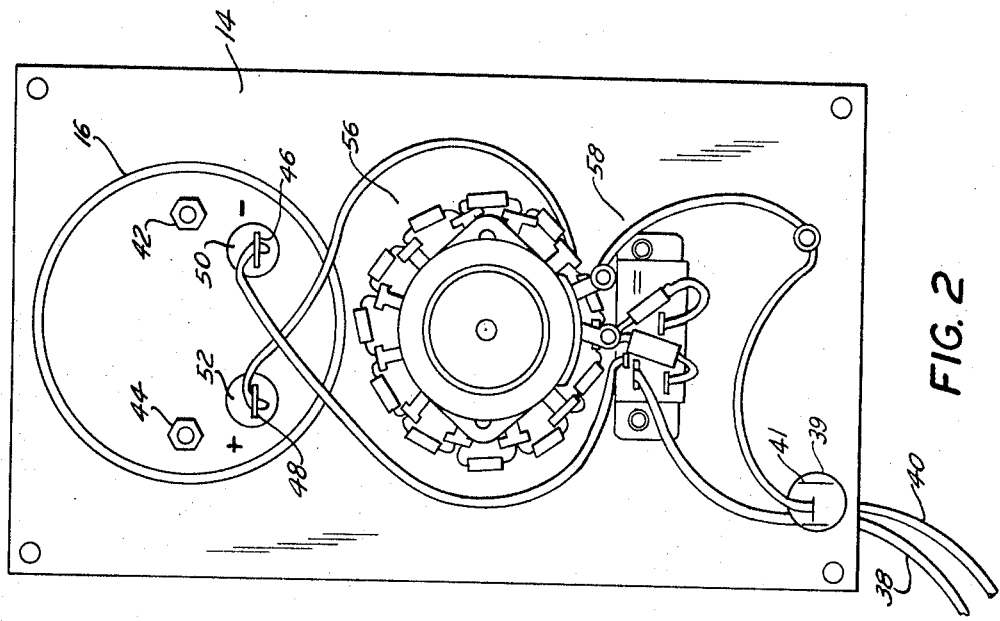
FIG. 2 is a rear elevational view of the tester shown in FIG. 1.
Figure 1:
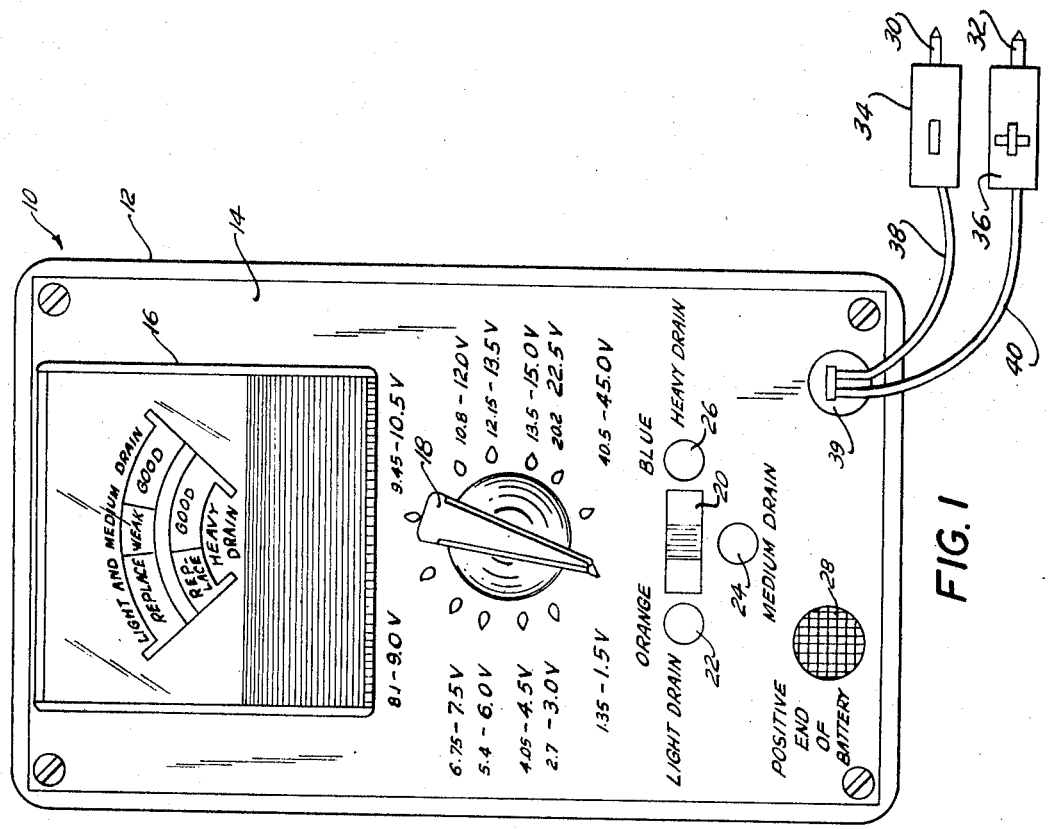

As shown in FIG. 1, a battery tester 10, as viewed from the front, comprises a housing 12 having a front panel 14 on which are supported an indicating meter 16, a knob 18 for operating the switch and two ganged rheostats, seen in FIGS. 2 and 3, with the switch knob 18 movable to various positions indicated, corresponding to the number of cells and the voltage of a battery to be tested. The front panel 14 also supports a three-position service condition switch 20 which is movable to an intermediate position and to either extreme position according to the nature of the service to which the battery will be subjected in use. The three positions as further indicated by three legends are represented by a button 22, and legend for "light drain", by a button 24 and legend for an intermediate position labeled "medium drain", and by a button 26 and legend "heavy drain", to indicate the right hand position to which switch 20 will be moved for batteries to be subjected to such service test.

For further simplifying the testing of an external battery, a button 28 is provided near the bottom border of the front panel 14 to permit an outside battery, whose voltage terminals of opposite polarity are on opposite ends of the battery, to be seated with one terminal on that button 28, which is connected internally to a positive input terminal of the internal wiring.

Two other input terminals are provided by two external prong point terminals 30 and 32, supported in insulating cylinders 34 and 36, respectively, and connected to the internal circuit wiring through flexible leads 38 and 40, respectively, to permit the two outer prong terminals 30 and 32 to be connected to the terminals of an external battery that are mounted in positions to make it inconvenient to place the positive terminal of the battery on the button 28 on the front panel of the tester.

The indicating meter 16 is provided with two scales 16A and 16B on which a movable pointer 16-P indicates the condition of the battery being tested, as being used up and to be replaced, or as being still good for further use, according to the voltage of the battery under test and according to the current capacity still available.

As shown in FIG. 2, as a rear view of the panel 14, the meter 16 is anchored in place by two suitable anchoring studs and nuts 42 and 44, to hold the meter against displacement on and from the panel 14. Two terminals 46 and 48 of the meter 16 are accessible through openings 50 and 52 in the metal panel 14 which may be of aluminum, with the holes 50 and 52 large enough to assure no contact with the meter terminals 46 and 48.

The ganged switch 56 and the resistors associated therewith and connected thereto are shown directly beneath the meter and directly behind the operating switch handle 18 shown on the front of the panel in FIG. 1. Directly under the ganged switch 56 is a service type switch 58, which may be shifted to anyone of the three positions indicated in the front view in FIG. 1, to provide the appropriate circuitry in the ganged switch 56 for an appropriate reading on the meter corresponding to the type of service to which the battery under test will be subjected during service.

The two battery leads 38 and 40 shown in FIG. 1 are again shown in FIG. 2 as extending through an opening 39 in which an insulating grommet 41 is anchored to hold the battery leads 38 and 40 against undesirable movement or displacement. Those two leads are shown connected to appropriate terminals which will be more clearly identified in the complete circuit diagram shown in FIG. 3.

As shown in FIG. 3, the meter 16 is shown provided with two terminals 60 and 62 which are connected through suitable conductors to the two outer prong terminals 30 and 32 at the ends of the flexible leads of the instrument shown in FIGS. 1 and 2. The auxiliary positive terminal 28, connected to the same conductor as the positive terminal 32, is also shown in FIG. 3 as well as in FIG. 1, to indicate the resting terminal on which one end of an outside battery or cell may be seated while the other terminal of the battery or cell may be connected to the negative electrode 30 of the terminal lead 38 in FIG. 1.

As shown in FIG. 3, three rheostats 64, 66 and 68 are respectively provided with wiping contact terminals 64-A, 66-A and 68-A which are all mechanically mounted for simultaneous movement by a single shaft 70, indicated by the broken lines joining the three wiping contacts 64-A, 66-A and 68-A. The operating shaft 70 is arranged to be rotated by the knob 18 shown in FIG. 1, and schematically indicated in FIG. 3.

The incremental resistance switch 64 is provided with a series of terminals respectively corresponding to the voltage of an external battery that is to be tested, and connected to the resistors K which are also in series. The voltages are shown increasing in increments of 1.5 volts, to correspond to the general average voltage of a commercial unit cell. Thus, the voltages are indicated from 1.5 volts of a single cell battery, up to 15.0 volts for a ten-cell battery, with the extreme two terminal points indicated for use to measure the condition of a battery of 22.5 volts or one of 45.0 volts. The resistors series connected between the successive terminals are indicated, with the designation 1K representing one kilohm, of 1,000 ohms, so that 1 kilohm resistance is shown between each of the successive terminal points from the first marked 1.5 volts to the one marked 15.0 volts. The resistors to the final two terminals are indicated as 5.1 kilohms and 15 kilohms, respectively. The variable shunt resistor 66 is shown as a continuous rheostat, and varies as indicated on the diagram from 0 to 13.5 ohms, and is connected in series with a fixed resistor 72 having the indicated value of 1.5 ohms.

The variable shunt resistor 68 is shown as a continuous rheostat with a movable contact 68-a movable from a point of 0 ohms to a final value of 720 ohms, and that rheostat 68 is connected in series with a fixed resistor 74 having a value of 80 ohms.

The three switches 64-A, 66-A and 68-A are ganged on a single operating shaft 70, as shown by the broken line in FIG. 3, for simultaneous operation by the operating knob 18. That operation sets the tester for the value of the battery that is to be connected to the two terminals 30 and 32 for testing. In addition, however, it is desired to obtain a test reading that will demonstrate the condition of the battery for the specific use for which it is to be put in service. For that purpose, the switch 20 shown in FIG. 1 is now indicated in FIG. 3 as embodying a three-position slide switch 76, which is movable from an extreme right-hand position shown marked LD, representing the condition "Low Drain", to a mid-position represented by the letters MD representing "Medium Drain", and is movable to a third position at the extreme left, represented by the letters HD meaning "High Drain".

The two rheostat resistor circuits 66 and 68 are provided for service only over the range from 1.5 volts to 15.0 volts, of the ganged switching arrangement. When the switch is set on the 22.5 volt or on the 45.0 volt position, the two rheostats 66 and 68 are disconnected from the circuit.

Thus it will be seen that the variable resistor 64 with its terminals represents a series resistor for connection in the positive conductor between the positive input terminal 32, or the corresponding button 28, and the positive terminal 62 on the meter.

The two rheostats 66 and 68, however, are disposed to function as parallel shunts between the positive input terminal 32 and the negative input terminal 30, to provide a circuit to measure a voltage drop corresponding to the battery voltage.

In order to illustrate simply, the effect of the switch 20, the conditions representative of the three positions of the service condition switch 20 are shown in FIG. 4, a, b and c, for a battery of three cells representing a voltage of about 4.5 across the battery to be tested. As shown in FIG. 3 and FIG. 4 a with the blade 76 of the service switch 20 of FIG. 3 in low drain position, between terminals a and b of switch 20, the meter 16 is connected to an external battery 65 to be tested with the wiper 64-A on the 4.5 volt terminal so that the series resistance 64 includes 2 kilohms in series circuit between the meter 16 and the test battery 65. For that "low drain" setting, neither shunt rheostat 66 or 68 is connected in circuit.

For that same setting of the switch for the battery of 4.5 volts, when it is of such type as to provide a medium drain, the blade 76 will be moved to bridge the two mid terminals 20-b and 20-c to connect rheostat 68 in shunt circuit across the two conductors 38 and 40, at the input terminals. In this circuit arrangement the 4.5 volts of the battery establishes a voltage drop within range close to or at 4.5 volts across the circuit including the fixed resistor 74 and the variable rheostat 68. The resistance introduced by the rheostat 68 corresponds to a load to which the battery will be normally subjected during service, and the meter 16 thus measures the voltage drop across the load and thus provides an indication of the battery condition as being up to voltage or below voltage suitable for serving such load.

FIG. 4-c shows the circuit arrangement for high drain. The resistance terminal 64-a is on the 4.5 volt terminal of the rheostat 64. The rheostat 68 is now disconnected, and rheostat 66 is now connected in shunt between the two conductors 38 and 40 by blade 76 of switch 20 on contacts 20-c and 20-d. For the position now being considered, the shunt circuit includes the 1.50 ohm resistor 72 and three ohms of the rheostat 66, making a total shunt resistance of 4.5 ohms, that provides a heavy drain of one ampere on the battery, with the 1 ampere through the shunt rheostat 66 providing a voltage drop in the range approaching 4.5 volts across the rheostat circuit 66, so the voltage on the meter will correspond to the voltage of the battery and thus indicate whether it is sufficient to provide the current capacity needed for service of that heavy drain application.

With each adjustment of the ganged rheostat switch to a different position to accommodate the testing of a battery of a different voltage, the appropriate resistors are included in the series circuit, and in the shunt circuit, to keep the current through the meter within the operating range of the meter, so that the indication on the scale of the meter will indicate whether the voltage of the battery being tested shows a condition in the battery that is adequate for the service for which it is to applied or whether the battery is no longer fit for service and should be replaced. Thus, as shown on the face of meter 16, the voltage of the battery being tested will be shown to be low and unsuited for use, or will be shown to be high and adequate for service in its intended field of use.

The invention is not limited to any specific type of meter or switch arrangement since various modifications may be made in the type of meter and in the values of the resistors and rheostats with the provision however that the external resistors, particularly the series resistors, should be such, in respect to the resistance of the meter coil, that the current through the meter will be kept within the range for which it is designed, to provide a pointer actuation to indicate the voltage of the battery being tested as being at a certain value within a selected range.

Thus such modifications may be made within the spirit and scope of the invention without departing from the spirit and scope of the claims herein.

What is claimed is:

1. A multiple level drain tester for batteries containing a variable number of cells, comprising
   a. an indicating meter having an indicating pointer, at least one scale, actuating means for said pointer, responsive to the current from the battery to be tested and meter terminals;
   b. battery terminals to be connected to said battery
   c. resistance means serially connected between said meter terminals and said battery terminals, comprising incrementally variable series resistance means proportioned to the number of cells in said battery.
   d. first switch means for adjusting the resistance increments of said series resistance in proportion to the number of cells in the battery
   e. at least two variable shunt resistance means connected across said battery and meter terminals for simulating test load drain conditions, each of said shunt means connected with said first switch means and simultaneously actuated thereby for proportionally varying the shunt resistance according to said cell number and f. second switch means for disconnecting all of said shunt means but the one simulating the drain condition being tested on said battery.

2. A battery tester, according to claim 1 in which said meter actuating means is an actuating coil and said incremental series resistance means is variable to include an effective resistance value in said meter coil circuit corresponding to the number of unit cells in the battery being tested.

3. A battery tester, according to claim 1 in which said two shunt resistance means contains a fixed resistor, and variable resistance providing effective resistance value corresponding to the number of unit cells in the battery being tested.

4. A battery tester, as in claim 1, in which said at least one scale of
said indicating meter is divided into regions indicating the battery being tested is adequate or inadequate for the service for which the battery is being tested.

* * * * *